United States Patent
Chaloux et al.

(10) Patent No.: US 9,616,910 B2
(45) Date of Patent: Apr. 11, 2017

(54) DETACHABLE UMBRELLA MOUNTS FOR COOLERS AND METHODS FOR USING THE SAME

(71) Applicant: Shade Cooler LLC, Milton, GA (US)

(72) Inventors: Michael Chaloux, Milton, GA (US); Leo Mustaki, Milton, GA (US)

(73) Assignee: Shade Cooler LLC, Milton, GA (US)

( * ) Notice: Subject to any disclaimer, the term of this patent is extended or adjusted under 35 U.S.C. 154(b) by 52 days.

(21) Appl. No.: 14/629,179

(22) Filed: Feb. 23, 2015

(65) Prior Publication Data
US 2016/0244081 A1 Aug. 25, 2016

(51) Int. Cl.
*B62B 3/04* (2006.01)
*B62B 5/00* (2006.01)
*A45C 11/20* (2006.01)
*A45C 15/00* (2006.01)
*A45B 23/00* (2006.01)

(52) U.S. Cl.
CPC ............... *B62B 3/04* (2013.01); *A45C 11/20* (2013.01); *A45C 15/00* (2013.01); *B62B 5/00* (2013.01); *A45B 2023/0012* (2013.01); *A45B 2200/1054* (2013.01)

(58) Field of Classification Search
CPC ............ A45B 11/00; A45B 2023/0025; A45B 2200/1054; A45B 2200/1063; B62B 1/00; B62B 1/02; B62B 1/04; B62B 1/10; B62B 1/12; B62B 1/125; A45C 13/262; A45C 13/28; A45C 2013/267
See application file for complete search history.

(56) References Cited

U.S. PATENT DOCUMENTS

| | | | | |
|---|---|---|---|---|
| 3,407,825 A | * | 10/1968 | Doyle | A45B 11/00 135/16 |
| 4,789,200 A | | 12/1988 | Munguia | |
| 5,022,420 A | * | 6/1991 | Brim | A01D 67/02 135/161 |
| 5,255,954 A | * | 10/1993 | Rogers | A47C 7/66 135/96 |
| 5,269,157 A | * | 12/1993 | Ciminelli | A45B 11/00 280/47.18 |

(Continued)

OTHER PUBLICATIONS

U.S. Appl. No. 29/518,385, Shade Cooler LLC.

*Primary Examiner* — J. Allen Shriver, II
(74) *Attorney, Agent, or Firm* — Eversheds Sutherland (US) LLP

(57) ABSTRACT

Detachable umbrella mounts for coolers are provided that include a base, having two or more coupling elements spaced from one another for engaging a tow handle of a cooler when the detachable umbrella mount is in the mounted configuration, that is configured to be selectively engaged with the tow handle when the detachable umbrella mount is in a mounted configuration and, alternatively disengaged from the tow handle when the detachable umbrella mount is in an unmounted configuration, and an elongated tubular member attached to the base and extending from a base end to a top end having a top opening configured to receive at least a portion of a shaft of an umbrella. Coolers are also provided that include a container portion and a detachable umbrella mount selectively affixed thereto. Methods for selectively mounting a detachable umbrella mount to a cooler are also provided.

34 Claims, 12 Drawing Sheets

(56) References Cited

U.S. PATENT DOCUMENTS

| | | | |
|---|---|---|---|
| 5,480,170 A | 1/1996 | Kaiser, II | |
| 5,636,852 A * | 6/1997 | Sistrunk | B62B 1/12 248/156 |
| 6,113,129 A * | 9/2000 | Marques | B62B 1/12 248/129 |
| 6,199,819 B1 | 3/2001 | Churillo | |
| 6,244,557 B1 * | 6/2001 | Maze | A45B 11/00 248/214 |
| 6,308,722 B1 * | 10/2001 | Christie | A45B 11/00 135/16 |
| 6,435,469 B1 | 8/2002 | Ratcliff et al. | |
| 6,474,097 B2 | 11/2002 | Treppedi et al. | |
| 6,536,733 B1 | 3/2003 | Sharp | |
| 6,554,012 B2 | 4/2003 | Patarra | |
| 6,634,609 B2 * | 10/2003 | Zheng | A45B 11/00 248/277.1 |
| 6,708,703 B1 | 3/2004 | Rivers et al. | |
| 6,796,319 B1 | 9/2004 | Patarra et al. | |
| D514,891 S | 2/2006 | Garcia et al. | |
| 6,993,931 B1 | 2/2006 | Hamilton | |
| 7,140,507 B2 | 11/2006 | Maldonado et al. | |
| 7,143,601 B1 | 12/2006 | Jimenez | |
| 7,226,126 B1 * | 6/2007 | Spanovich | A47C 4/286 135/96 |
| 7,631,654 B2 * | 12/2009 | Blumenthal | A45B 19/06 135/16 |
| 7,690,389 B2 * | 4/2010 | Barreiro | A45B 11/00 135/16 |
| 7,740,220 B2 * | 6/2010 | Jeanveau | A45B 11/00 248/534 |
| 8,210,193 B2 * | 7/2012 | Ortiz | A45B 11/00 135/88.04 |
| D674,245 S | 1/2013 | Williams, Jr. et al. | |
| 8,439,055 B2 * | 5/2013 | April | A45B 11/00 135/16 |
| 8,523,196 B1 * | 9/2013 | Appleby | B62B 1/26 135/95 |
| 8,714,511 B2 | 5/2014 | Zoeteman | |
| 8,979,073 B2 * | 3/2015 | Lykins | F04D 29/705 261/116 |
| 9,282,797 B1 * | 3/2016 | Soto | A45C 11/20 |
| 2007/0096004 A1 | 5/2007 | Quiambao, Jr. | |
| 2009/0205692 A1 * | 8/2009 | Sapp | A45B 11/00 135/16 |
| 2010/0071737 A1 * | 3/2010 | Gourdine | A45B 11/00 135/16 |
| 2011/0240072 A1 * | 10/2011 | Barac-Bauer | A45B 11/00 135/16 |
| 2012/0073615 A1 * | 3/2012 | Fletcher | A45B 11/00 135/16 |
| 2012/0168598 A1 | 7/2012 | Walker et al. | |
| 2014/0084012 A1 | 3/2014 | LeAnna | |
| 2014/0263926 A1 | 9/2014 | LeAnna | |

* cited by examiner

DETACHABLE UMBRELLA MOUNTS FOR COOLERS AND METHODS FOR USING THE SAME

TECHNICAL FIELD

The present disclosure relates generally to umbrella mounts, and more particularly to detachable umbrella mounts for coolers.

BACKGROUND

Umbrellas are widely used to provide protection from the sun or other environmental elements, such as at a beach, park, lawn, or deck. The protection provided by an umbrella is desirable for several reasons, for example, relief from the sun or heat or to avoid sunburn. Since umbrellas are generally used outside, various mounting means have been employed to stabilize umbrellas during use. For example, various types of heavy bases have been designed to provide stabilization. Although heavy bases have been found to be useful for stationary umbrellas, these heavy bases are impractical for mobile umbrellas due to their weight. The weight of the bases makes it difficult for one to carry from one location to another, even if the bases are equipped with wheels.

Efforts have been made in developing mounting stands for mobile umbrellas that include configuring coolers with a receptacle to receive an umbrella pole such that the coolers function as the stabilizing base for the umbrella placed therein. However, most of these receptacles are permanently integrated within the cooler themselves, and therefore the receptacles are unable to be detached from the coolers when desired. The inability to detach the receptacles, thereby results in coolers having undesirable, complicated, or costly structural configurations. Further, the structural configurations of these coolers can also hinder one's access to the contents of the cooler because of the required positioning of the receptacle within the cooler itself, e.g., in the center of the cooler.

Accordingly, there is a need for improved umbrella mounts for coolers that are capable of ameliorating some or all of the foregoing disadvantages. In particular, it would be desirable to provide umbrella mounts that are easily portable and capable of being selectively attached to and detached from a cooler, when desired, without requiring the cooler to be undesirably structured. It would also be desirable for the umbrella mounts to be configured to mount to the cooler at a location such that the cooler, along with the detachable umbrella mount, effectively serve as a stabilizing base for an umbrella during use.

SUMMARY

In one aspect, detachable umbrella mounts for coolers are provided, wherein the cooler includes a container portion with at least one side wall extending from a container bottom to a container top and a longitudinal axis extending from the container bottom to the container top, wheels rotatably mounted to the container proximate the container bottom, and a tow handle mounted to the container portion. In one embodiment, the detachable umbrella mount includes a base, having two or more coupling elements spaced from one another for engaging the tow handle when the detachable umbrella mount is in the mounted configuration, that is configured to be selectively engaged with the tow handle when the detachable umbrella mount is in a mounted configuration and, alternatively disengaged from the tow handle when the detachable umbrella mount is in an unmounted configuration, and an elongated tubular member attached to the base and extending from a base end to a top end having a top opening configured to receive at least a portion of a shaft of an umbrella. The elongated tubular member is attached to the base such that, when the detachable umbrella mount is in the mounted configuration, the elongated tubular member extends in a direction at least generally parallel to the longitudinal axis of the container portion with the base end of the elongated tubular member closer to the container bottom than is the top end.

In another aspect, coolers are provided. In one embodiment, the cooler includes a container portion with at least one side wall extending from a container bottom to a container top and a longitudinal axis extending from the container bottom to the container top, wheels rotatably mounted to the container proximate the container bottom, a tow handle mounted to the container portion, and a detachable umbrella mount, as described above, that is selectively affixed to the container portion.

In yet another aspect, methods for selectively mounting a detachable umbrella mount to a cooler are provided. In one embodiment, the method includes engaging a base of a detachable umbrella mount, as described above, with a tow handle of a cooler, as described above.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

The present invention is described in detail in connection with various embodiments for purposes of illustration only. Parameters of different steps, components, and features of the embodiments are described separately, but may be combined consistently with this description of claims, to enable other embodiments as well to be understood by those skilled in the art. Various terms used herein are likewise defined in the description which follows.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means±20% of the stated value, ±15% of the stated value, ±10% of the stated value, ±5% of the stated value, or ±3% of the stated value.

Detachable umbrella mounts for coolers have been developed. Coolers are desirably utilized as stabilizing bases for umbrellas for several reasons, for example: (i) coolers are often taken to a location, e.g., the beach or park, where an umbrella might be desirable for protection against environmental elements such as the sun or wind; (ii) coolers are typically filled with food or beverage with or without ice or ice packs, thereby increasing the weight of the cooler; (iii) coolers are easily portable from one location to another; and (iv) coolers, when protected from environmental elements via an umbrella, are found to be more likely to maintain a desired internal temperature for longer periods of time.

The detachable umbrella mounts described herein generally include a base and an elongated tubular member. The features of the present detachable umbrella mounts beneficially enable easy and selective attachment and removal of the detachable umbrella mounts from a cooler when desired, rather than having the mount permanently integrated within the cooler as required with prior known cooler/umbrella mount combinations. That is, the detachable umbrella mount when selectively mounted to the cooler, utilizes the weight of the cooler to help stabilize the umbrella during use without having to adapt the structure of the cooler itself or affect access to the cooler contents located therein. Further, the detachable umbrella mounts, when mounted to a cooler, also advantageously provide the ability for easy transport of an umbrella with the cooler, rather than having to transport the umbrella separately.

Coolers

Figure 1A:
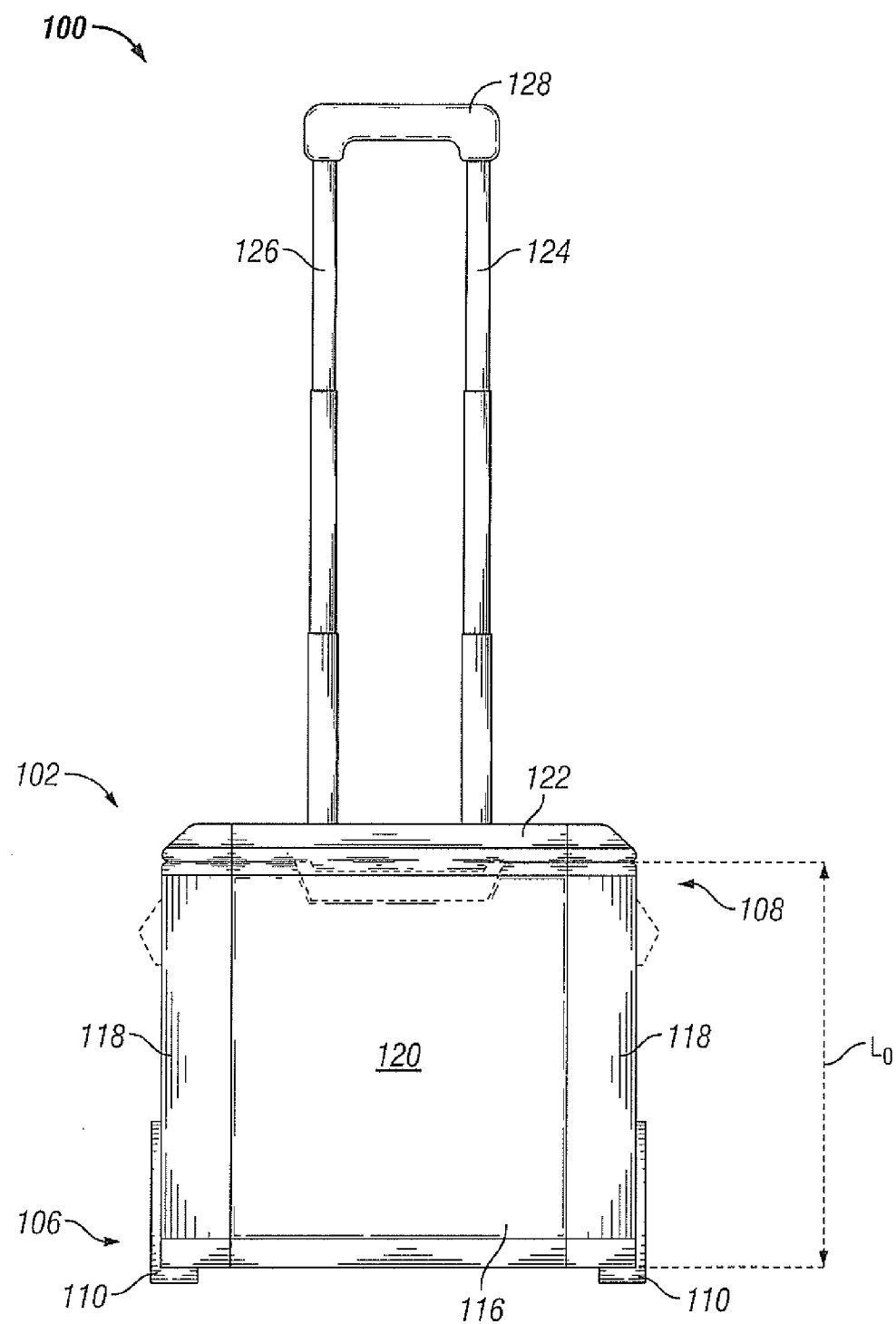
FIG. 1A is a front view of a cooler prior to a detachable umbrella mount being selectively mounted thereto in accordance with an embodiment of the present disclosure.
Figure 1B:
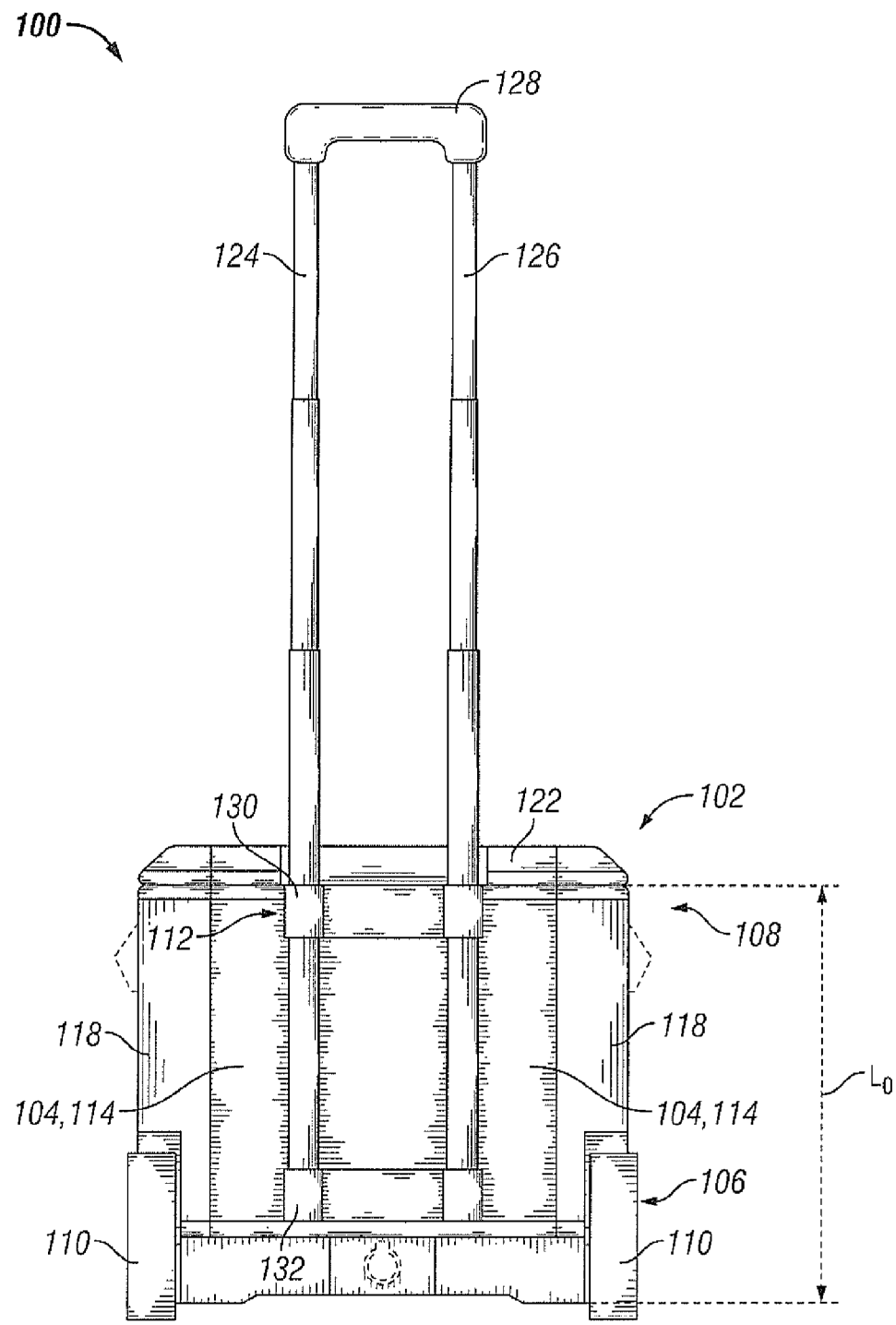
FIG. 1B is a back view of the cooler shown in FIG. 1A.
Figure 1D:
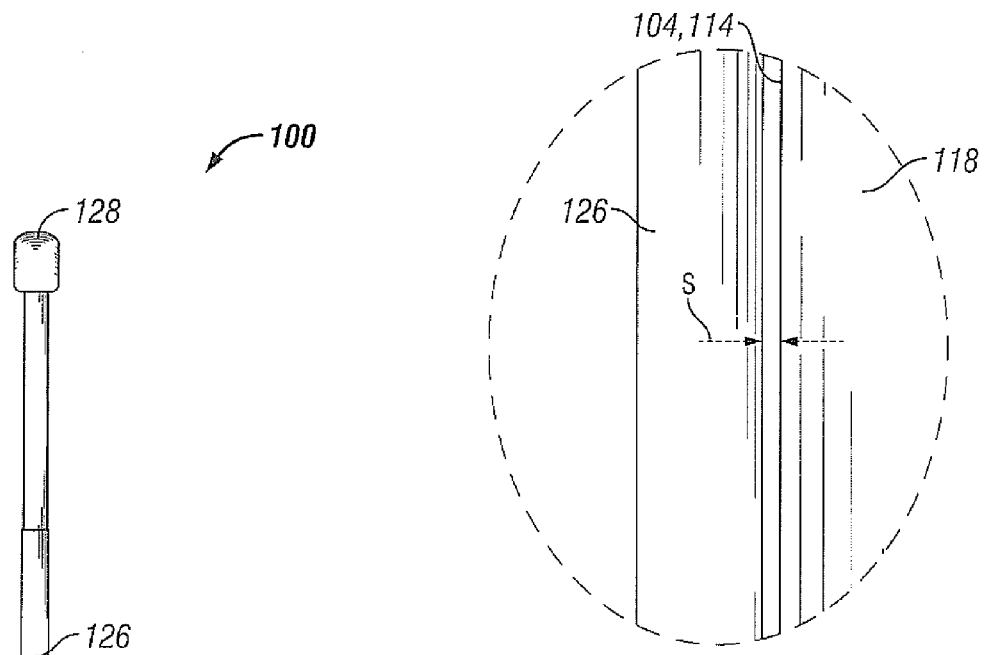
FIG. 1D is a magnified view of a portion of the cooler shown in FIG. 1C taken at 1D.
Figure 1C:
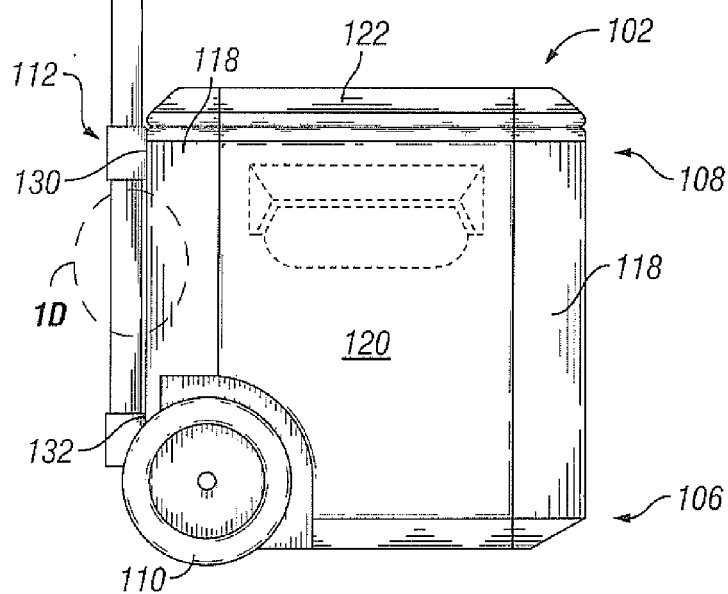
FIG. 1C is a side view of the cooler shown in FIG. 1A.
Figure 2:
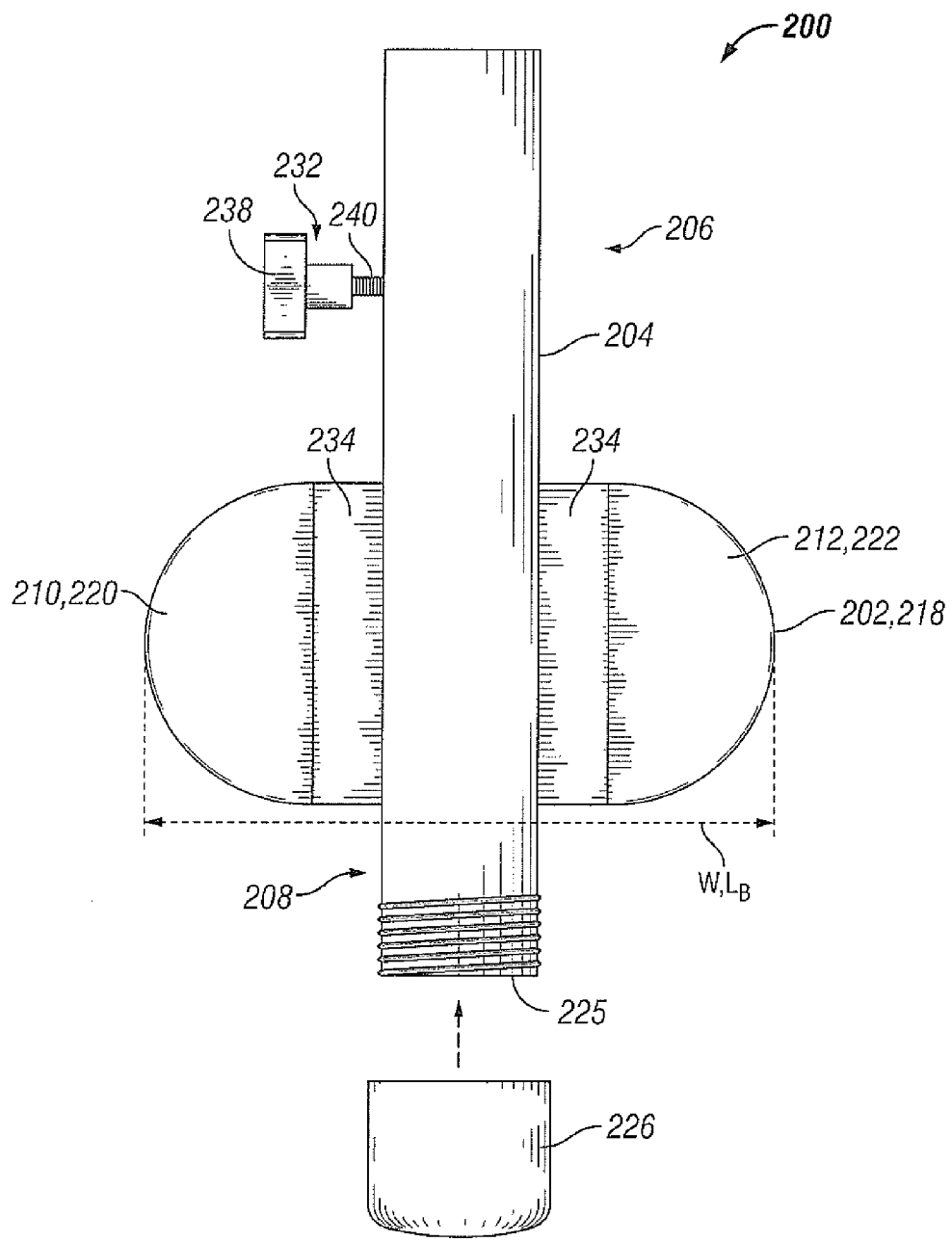
FIG. 2 is a front view of a detachable umbrella mount in accordance with an embodiment of the present disclosure.
Figure 3:
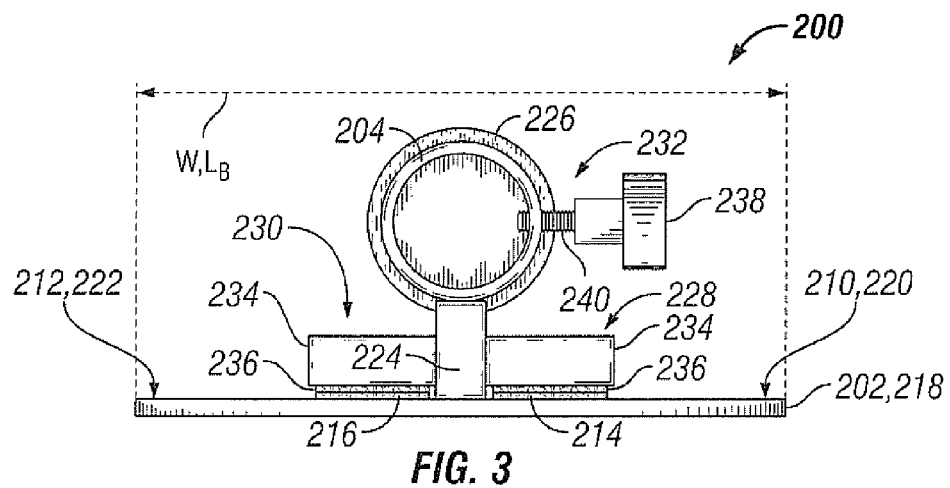
FIG. 3 is a top view of the detachable umbrella mount shown in FIG. 2.
Figure 4:
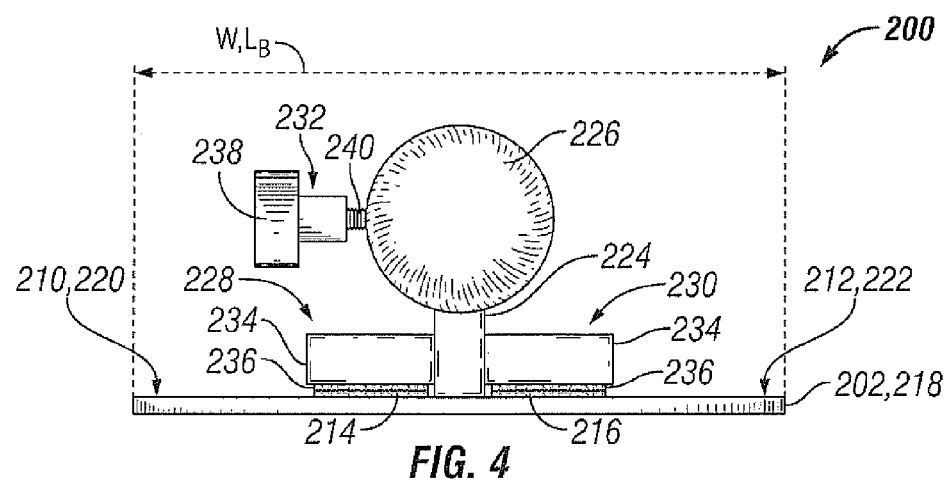
FIG. 4 is a bottom view of the detachable umbrella mount shown in FIG. 2.
Figure 5:
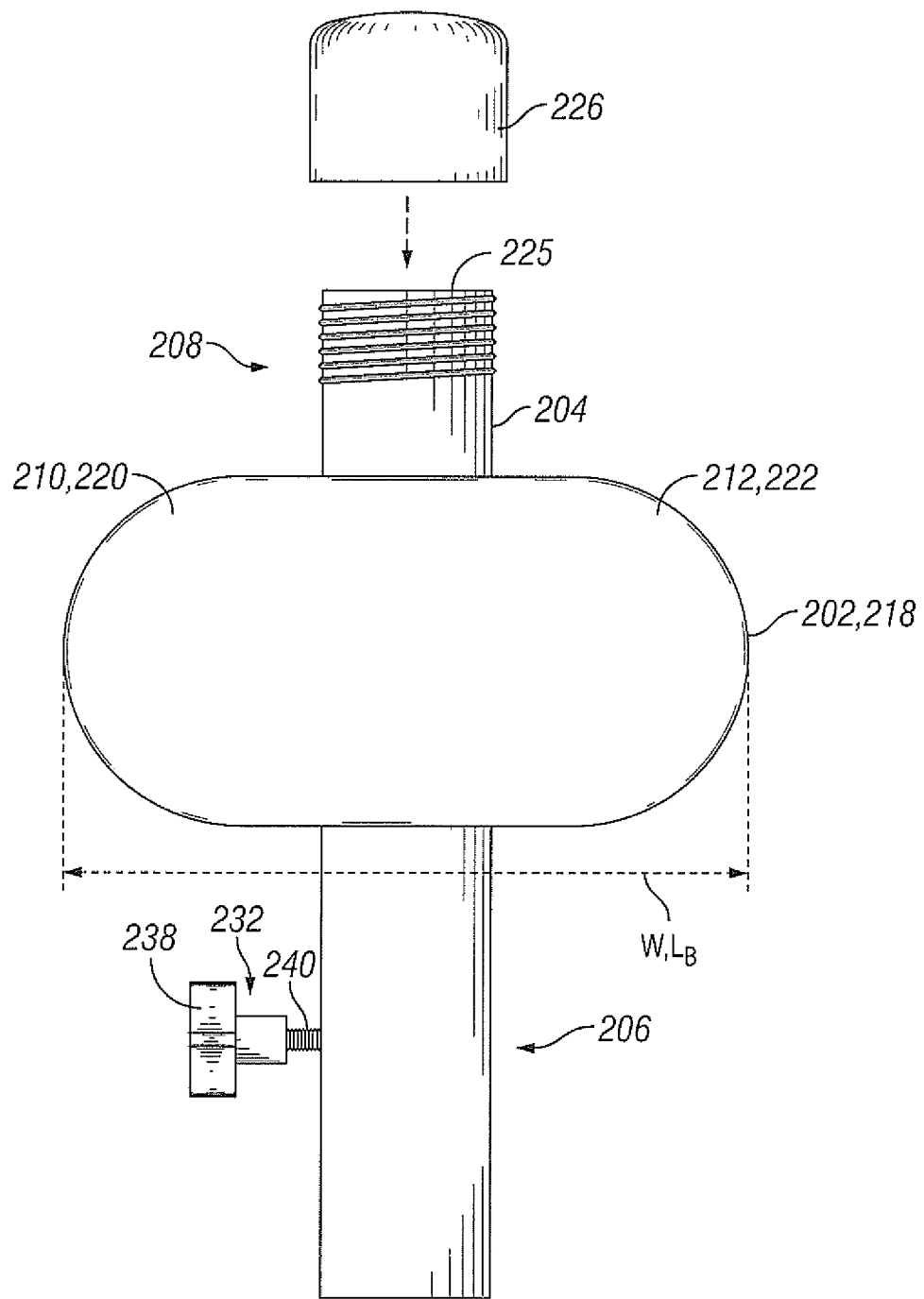
FIG. 5 is a back view of the detachable umbrella mount shown in FIG. 2.
Figure 6:
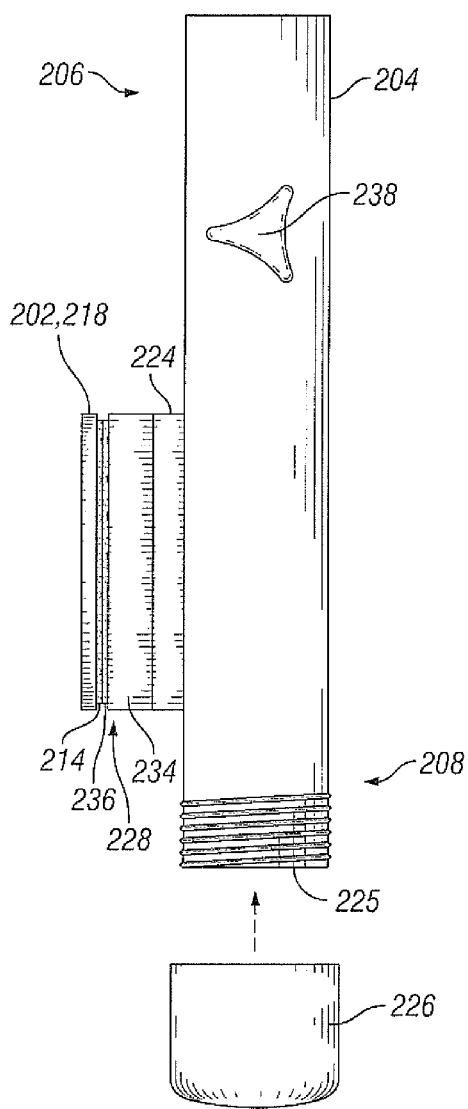
FIG. 6 is a first side view of the detachable umbrella mount shown in FIG. 2.
Figure 7:
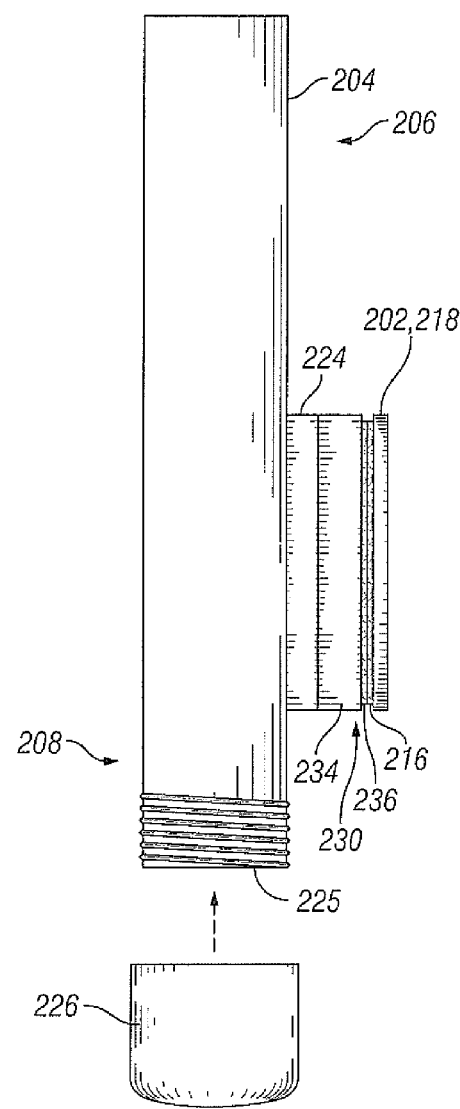
FIG. 7 is a second side view of the detachable umbrella mount shown in FIG. 2.

The coolers of the present disclosure are configured in which the detachable umbrella mounts described herein can be selectively mounted and unmounted thereto. This can be achieved in a variety of ways. For example, in one embodiment, as illustrated in FIGS. 1A-1C, the cooler 100 comprises a container portion 102 that includes at least one side wall 104 extending from a container bottom 106 to a container top 108, in which the container portion 102 has a longitudinal axis ($L_o$) extending from the container bottom 106 to the container top 108. The cooler 100 also includes wheels 110 that are rotatably mounted to the container portion 102 proximate the container bottom 106, and a tow handle 112 that is mounted to the container portion 102.

In embodiments, the container portion of the cooler can take the form of various different structural configurations. For example, the container portion may have a cylindrical or polygonal structural configuration. Non-limiting examples of suitable polygonal structural configurations include a triangle, a square, a rectangle, a pentagon, and an octagon.

Still referring to FIGS. 1A-1C, the container portion 100 is in the form of a polygonal structure, in which the at least one side wall 104 is the back wall 114 of the container portion 102. In this particular embodiment, the container portion 102 also includes a front wall 116 and additional side walls 118. As a result, the container portion 102 is at least partially enclosed to form an interior storage space 120 within the cooler 100. In some embodiments, the interior storage space includes food, beverages, ice, or combinations thereof.

In some embodiments, the cooler 100 includes an operable lid 122 positioned atop the container top 108 to provide protection and access to the interior storage space 120. The operable lid 122 when in the closed position forms a seal with the container top 108. In one embodiment, the operable lid is hingedly attached to the container portion proximate the container top.

In embodiments, the tow handle may include various configurations. In one embodiment, the tow handle includes a single handle bar. In another embodiment, as illustrated in FIGS. 1A-1C, the tow handle 112 includes two handle bars 124, 126 spaced from one another and extending along the at least one side wall 104 in a direction at least generally parallel to the longitudinal axis ($L_o$) to a handle bar 128 connecting the two handle bars 124, 126. In certain embodiments, the handle bar or bars may be telescopic, such as the two handle bars 124, 126 shown in FIGS. 1A-1C.

In embodiments, the tow handle may be partially or completely mounted to the container portion. In one embodiment, different portions of the tow handle are mounted to corresponding portions of the container portion. For example, as illustrated in FIGS. 1A-1C, tow handle is mounted to the at least one side wall 104 at points 130 and 132. As a result, the two handle bars 124, 126 are positioned at a distance with respect to the at least one side wall 104 of the container portion 102 so to form a space (S) there between as shown in FIG. 1D. In one embodiment, the space (S) is substantially equal to the thickness of a base of a detachable umbrella mount described herein, such that the base engages with the tow handle when the detachable umbrella mount is in the mounted configuration.

Detachable Umbrella Mounts

In embodiments, the detachable umbrella mounts described herein are configured for a cooler, such as the coolers described herein and above. The detachable umbrella mounts include a base comprising two or more coupling elements spaced from one another for engaging the tow handle of the cooler when the detachable umbrella mount is in the mounted configuration, and an elongated tubular member attached to the base and extending from a base end to a top end having a top opening configured to receive at least a portion of a shaft of an umbrella.

The base is configured to be selectively engaged with the tow handle of the cooler when the detachable umbrella mount is in a mounted configuration and, alternatively disengaged from the tow handle when the detachable umbrella mount is in an unmounted configuration. That is, the detachable umbrella mount is mounted to the cooler via the tow handle which is mounted to the container portion of the cooler. In this way, it beneficially is not required to adapt or modify the container portion of the cooler in order to enable the cooler to receive a shaft of an umbrella. The elongated tubular member is attached to the base such that, when the detachable umbrella mount is in the mounted configuration, the elongated tubular member extends in a direction at least generally parallel to the longitudinal axis of the container portion with the base end of the elongated tubular member closer to the container bottom than is the top end. That is, in the mounted configuration, the elongated tubular member is positioned in a substantially longitudinal direction so to enable the cooler to receive and stabilize a shaft of an umbrella.

In some embodiments, the base and/or the elongated tubular member comprises a material selected from a polymeric material, a ceramic material, a metal material, a wood material, or the like, or combinations thereof. Non-limiting examples of suitable polymeric materials include polyvinyl chloride (PVC), polyethylene (PE), polyethylene cross linked (PEX), polypropylene (PP), acrylonitrile-butadiene-styrene (ABS), and the like, and combinations thereof. Non-limiting examples of suitable ceramic materials includes fired clays, and the like, and combinations thereof. Non-limiting examples of suitable metal materials include aluminum, steel, and the like, and combinations thereof.

As used herein, "at least generally parallel to the longitudinal axis" means parallel or at an angle no more than about 60 degrees from the parallel.

In some embodiments where the tow handle includes two handle bars as described herein, the detachable umbrella mount is in the mounted configuration when one of the two or more coupling elements is engaged with one of the two handle bars and another of the two or more coupling elements is engaged with another of the two handle bars.

In some embodiments where the tow handle includes two handle bars as described herein, the base of the detachable umbrella mount has a width that is greater than a distance between the two handle bars of the tow handle. As used herein, the width of the base (W) is the distance of the base that extends substantially perpendicular to the longitudinal axis of the elongated tubular member (i.e., the axis that extends from the top end to the bottom end of the elongated tubular member) and parallel to the longitudinal axis of the base ($L_B$).

In some embodiments where the tow handle includes two handle bars as described herein, the base of the detachable umbrella mount has a length that is less than the distance between the two handle bars of the tow handle. As used herein, the length of the base (L) is the distance of the base that extends substantially parallel to the longitudinal axis of the elongated tubular member and parallel to the longitudinal axis of the base ($L_B$).

In some embodiments, one of the two or more coupling elements comprises a first engaging member extending outwardly from the base in a first direction and another of the two or more coupling elements comprises a second engaging member extending outwardly from the base in a second direction opposite the first direction.

In one embodiment where the tow handle includes two handle bars as described herein, the detachable umbrella mount is in the mounted configuration when the first engaging member is disposed in a first space between the at least one side wall of the cooler and the one of the two handle bars and the second engaging member is disposed in a second space between the at least one side wall of the cooler and the another of the two handle bars. That is, in such an embodiment, the detachable umbrella mount is in the mounted configuration when its base is positioned between the space that exists between the one side wall of the container portion of the cooler having the tow handle mounted thereto and the two handle bars of the tow handle.

In some embodiments, the base has a longitudinal axis extending substantially parallel to the first and second directions of the first and second engaging members. In one embodiment, during use, the detachable umbrella mount is shifted from the unmounted configuration to the mounted configuration when the base is placed between the two handle bars of the tow handle of the cooler and against the at least one side wall of the cooler with the longitudinal axis of the base substantially parallel to the longitudinal axis of the container portion of the cooler and then, the detachable umbrella mount is rotated about 90 degrees while maintaining the base against the at least one side wall of the cooler.

In some embodiments, the first engaging member is a first plate and the second engaging member is a second plate. In other embodiments, the base includes a plate and a first portion of the plate comprises the first engaging member and a second portion of the plate comprises the second engaging member.

In some embodiments, the elongated tubular member includes a base opening proximate the base end through which the umbrella shaft is extendable when the detachable umbrella mount is in the mounted configuration. This feature beneficially enables the shaft of the umbrella to be inserted into the surface the cooler rests upon, e.g., sand, soil, and the like, thereby providing additional stability to the umbrella during use.

In other embodiments, the base end of the elongated tubular member is closed to prevent the umbrella shaft from extending out from the base opening of the elongated tubular member when the detachable umbrella mount is in the mounted configuration. In one embodiment, the base opening is closed with a removable cap. In another embodiment, the base opening is permanently closed. This feature beneficially avoids the umbrella shaft from hindering the transportability of the cooler, when the umbrella shaft inserted into the detachable umbrella mount in the mounted configuration. This feature also advantageously enables the cooler to effectively stabilize the umbrella without requiring the shaft of the umbrella to be inserted into the surface the cooler rests upon, thereby providing the capability to use the umbrella independent of location. For example, the umbrella may be used at locations such as concrete driveways, concrete or wood decks, and the like.

In one embodiment the elongated tubular member includes a base opening proximate the base end and a closure for selectively closing the base opening to form a closed configuration for preventing the umbrella shaft from extending out from the base opening of the elongated tubular member when the detachable umbrella mount is in the mounted configuration and, alternatively, open the base opening to form an open configuration for allowing the umbrella shaft to be extendable through the base opening when the detachable umbrella mount is in the mounted configuration. In one embodiment, the base opening is closed with a removable cap that is configured to threadably engage and disengage the elongated tubular member proximate the base end.

In some embodiments where the tow handle comprises two handles bars as described herein, the detachable umbrella mount also includes an offset member positioned between the base and the elongated tubular member for spacing the elongated tubular member from the at least one side wall of the cooler and the two handle bars when the detachable umbrella mount is in the mounted configuration. That is, the elongated tubular member is positioned when the detachable umbrella mount is in the mounted configuration such that the tow handle does not interfere with the elongated tubular member itself or vice versa. This feature advantageously enables the tow handle to be utilized when the detachable umbrella mount is in the mounted configuration, thereby allowing the detachable umbrella mount to be selectively mounted and demounted or vice versa from the cooler, if and when desired, without impeding the use and transport of the cooler.

In some embodiments when the tow handle comprises two handle bars as described herein, the detachable umbrella mount also includes two or more stabilizing elements engaged with the base when the detachable umbrella mount is in the mounted configuration to prevent the base from sliding between the two handle bars. As a result, this feature beneficially maintains the position of the elongated tubular member between the two handle bars when the detachable umbrella mount is in the mounted configuration, thereby preventing the elongated tubular member from moving in a direction, along with the base, such that the detachable umbrella mount becomes unintentionally demounted from the cooler during umbrella use.

In one embodiment, the two or more stabilizing elements engage with the two or more coupling elements in a tongue and groove configuration. The tongue and groove configuration, in some embodiments, is achieved using Velco, Velcro-like material such as Dual Lock®, and the like. In another embodiment, the two or more stabilizing elements adhesively engage with the two or more coupling elements. For example, a pressure sensitive adhesive may be used to adhesively engage the two or more stabilizing elements with the two or more coupling elements.

In some embodiments, each of the two or more stabilizing elements include a stabilizing substrate and a connection element, wherein the connection element interconnects with or affixes to one of the two or more coupling elements. In one embodiment, the connection element interconnects with one of the two or more coupling elements via a tongue and groove configuration. The tongue and groove configuration, in some embodiments, is achieved using Velco, Velcro-like material such as Dual Lock®, and the like. In another embodiment, the connection element affixes to one of the two or more coupling elements via an adhesive such as a pressure sensitive adhesive.

In some embodiments, the detachable umbrella mount also includes a securing element to lock the umbrella shaft in place within the elongated tubular member. This feature beneficially enables the umbrella shaft to be secured within the elongated tubular member, thereby providing additional stabilization of the umbrella shaft. This additional stabilization may be advantageous so to prevent the shaft from being dislodged from within the elongated tubular member, for example, during transport or by environmental conditions during umbrella use, such as wind. In one embodiment, the securing element comprises a retainer knob threadably engaged proximate to the top end of the elongated tubular member.

An exemplary embodiment of a detachable umbrella mount is illustrated in FIGS. 2-7. The detachable umbrella mount 200 includes a base 202 and an elongated tubular member 204. The base 202 includes two coupling elements 210, 212, in which the first of the two coupling elements 210 includes a first engaging member 214 and the second of the two coupling elements 212 includes a second engaging member 216. The base 202 also includes a plate 218 having a first portion 220 and a second portion 222, in which the first portion 220 comprises the first engaging member 214 and the second portion 222 comprises the second engaging member 216. The elongated tubular member 204, having a top end 206 and a base end 208, is attached to the base 202 via an offset member 224 that is positioned between the base 202 and the elongated member 204, such that the elongated tubular member 204 is spaced at a desired extended distance from the cooler (not shown) when the detachable umbrella mount 200 is in the mounted configuration.

In this embodiment, the elongated tubular member has a base opening 225 that is selectively closed with a closure 226 that is threadably engaged to the base end 208 of the elongated tubular member 204. The closure 226 is engaged to the base end 208 for selectively closing the base opening 225 to form a closed configuration for preventing the umbrella shaft from extending out from the base opening 225 of the elongated tubular member 204 when the detachable umbrella mount 200 is in the mounted configuration. Once engaged, the closure 226 is then disengaged from the base end 208 to open the base opening 225 to form an open configuration for allowing the umbrella shaft to be extendable through the base opening 225 when the detachable umbrella mount 200 is in the mounted configuration.

In this embodiment, the base 202, the offset member 224, and the elongated tubular member 204 are formed as a monolithic structure via, e.g., injection molding. In an alternative embodiment, the base and offset member are formed as a monolithic structure and the elongated tubular member is attached to the offset member by one or more attachment elements. In another alternative embodiment, the offset member and the elongated tubular member are formed as a monolithic structure and the offset member is attached to the base by one or more attachment elements. In yet another alternative embodiment, the offset member is attached to the base and the elongated tubular member is attached to the offset member, each attached by one or more attachment elements. Non-limiting examples of suitable attachment elements include screws, bolts and nuts, nails, adhesives, and the like, and combinations thereof.

Still referring to FIGS. 2-7, the detachable umbrella mount 200 also includes two stabilizing elements 228, 230 and a securing element 232. Each of the two stabilizing elements 228, 230 includes a stabilizing substrate 234 and a connection element 236, in which the connection element 236 of each stabilizing element 228, 230 interconnects with the corresponding first and second engaging members 214, 216. The securing element 232 includes a retainer knob 238 that is threadably engaged, via a screw 240, proximate to the top end 206 of the elongated tubular member 204.

Methods of Mounting

In operation, the detachable umbrella mounts described herein are selectively mounted to and demounted from a cooler, such as the coolers described herein. In one embodiment, a method for selectively mounting a detachable umbrella mount to a cooler includes engaging the base of the detachable umbrella mount with the tow handle of the cooler.

In some embodiments, the step of engaging comprises shifting the detachable umbrella mount from an unmounted configuration to a mounted configuration.

In embodiments where the tow handle includes two handle bars as described herein, the step of shifting may include, in one embodiment, placing the base of the detachable umbrella mount between the two handle bars and against the at least one side wall with the longitudinal axis of the base substantially parallel to the longitudinal axis of the container portion, and rotating the detachable umbrella mount about 90 degrees while the base is maintained against the at least one side wall.

Figure 8A:
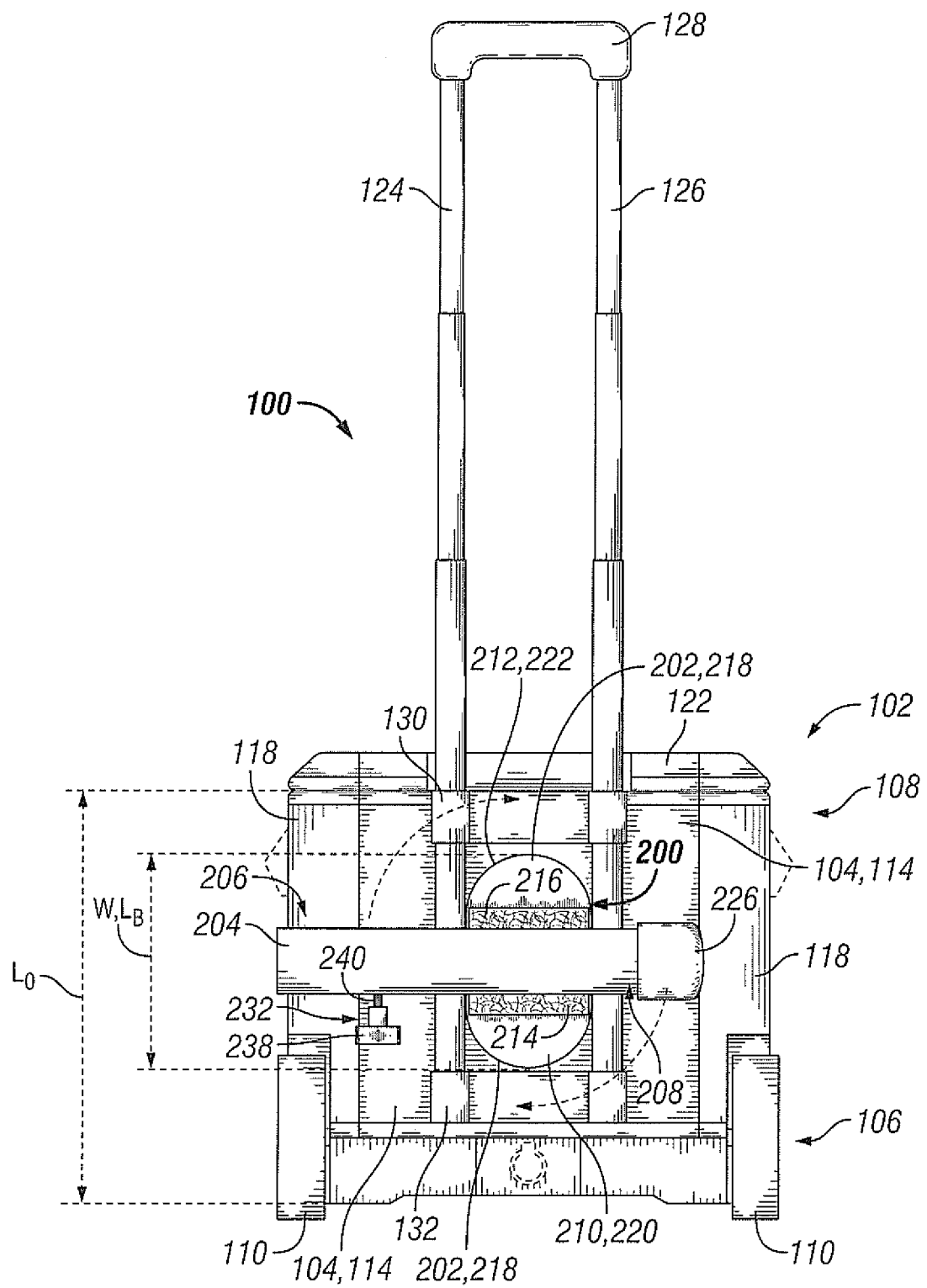
FIGS. 8A-8C are schematic illustrations of the detachable umbrella mount in FIG. 2 being selectively mounted to the cooler shown in FIGS. 1A-1C in accordance with an embodiment of the present disclosure.
Figure 8B:
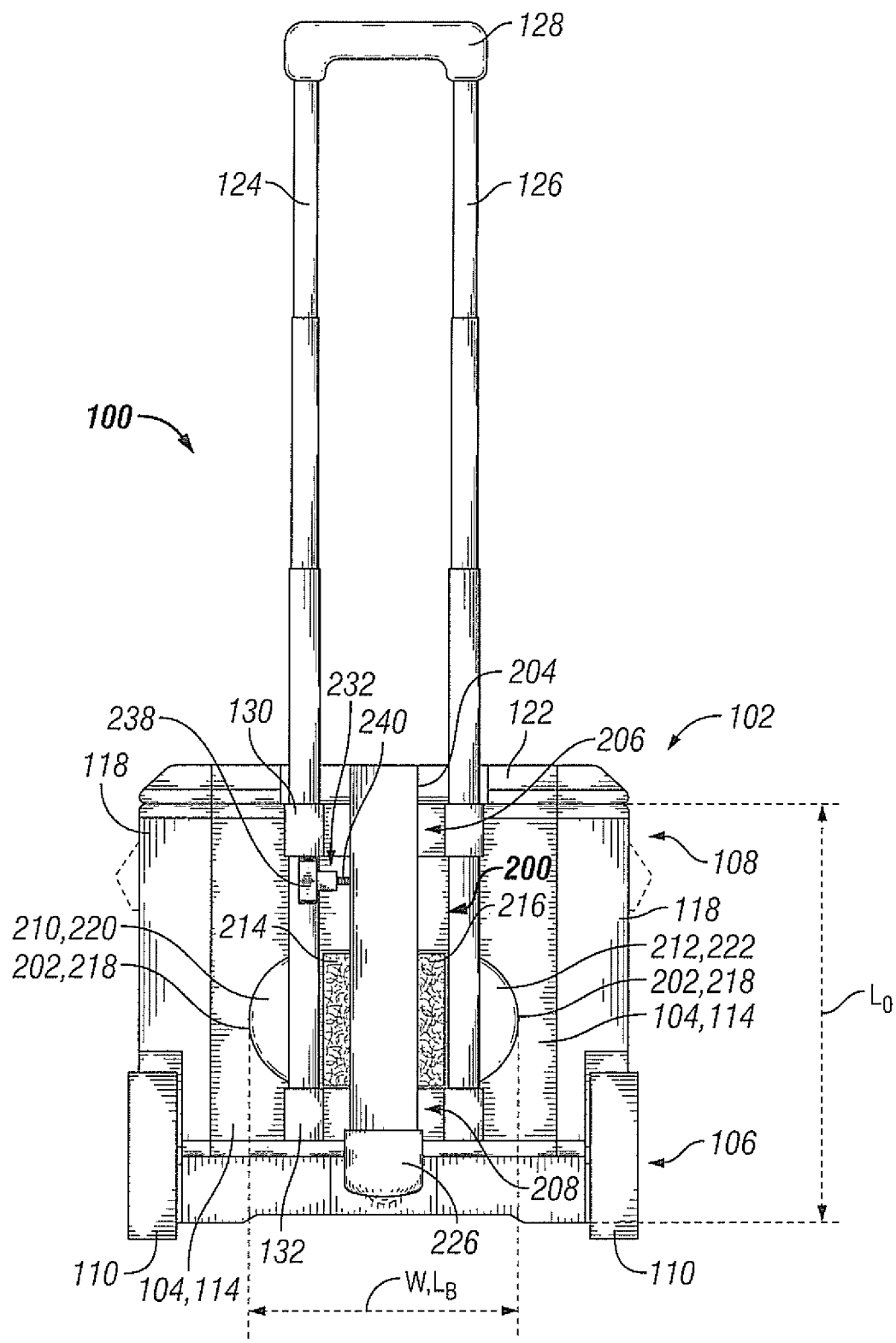
Figure 8C:
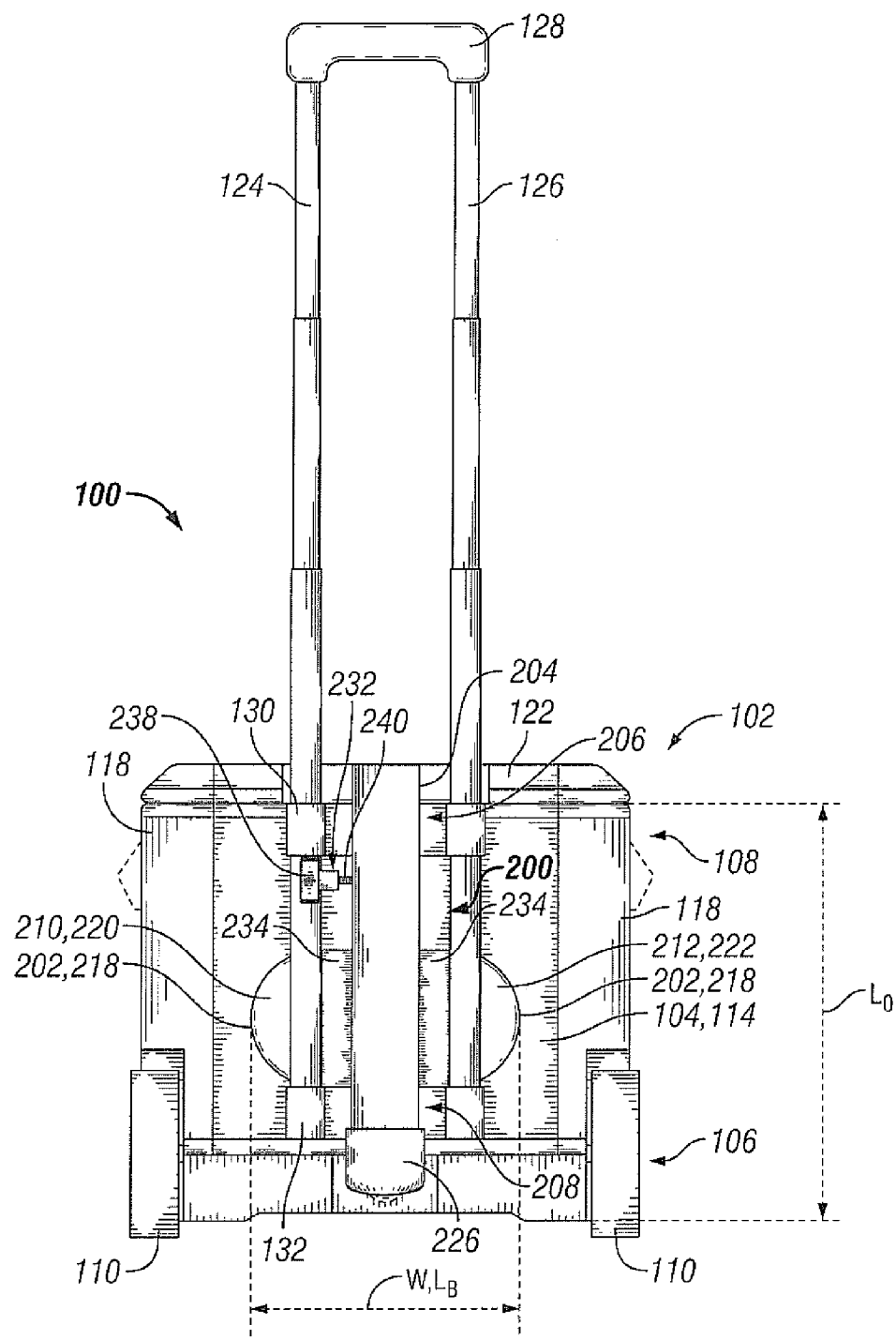
Figure 9:
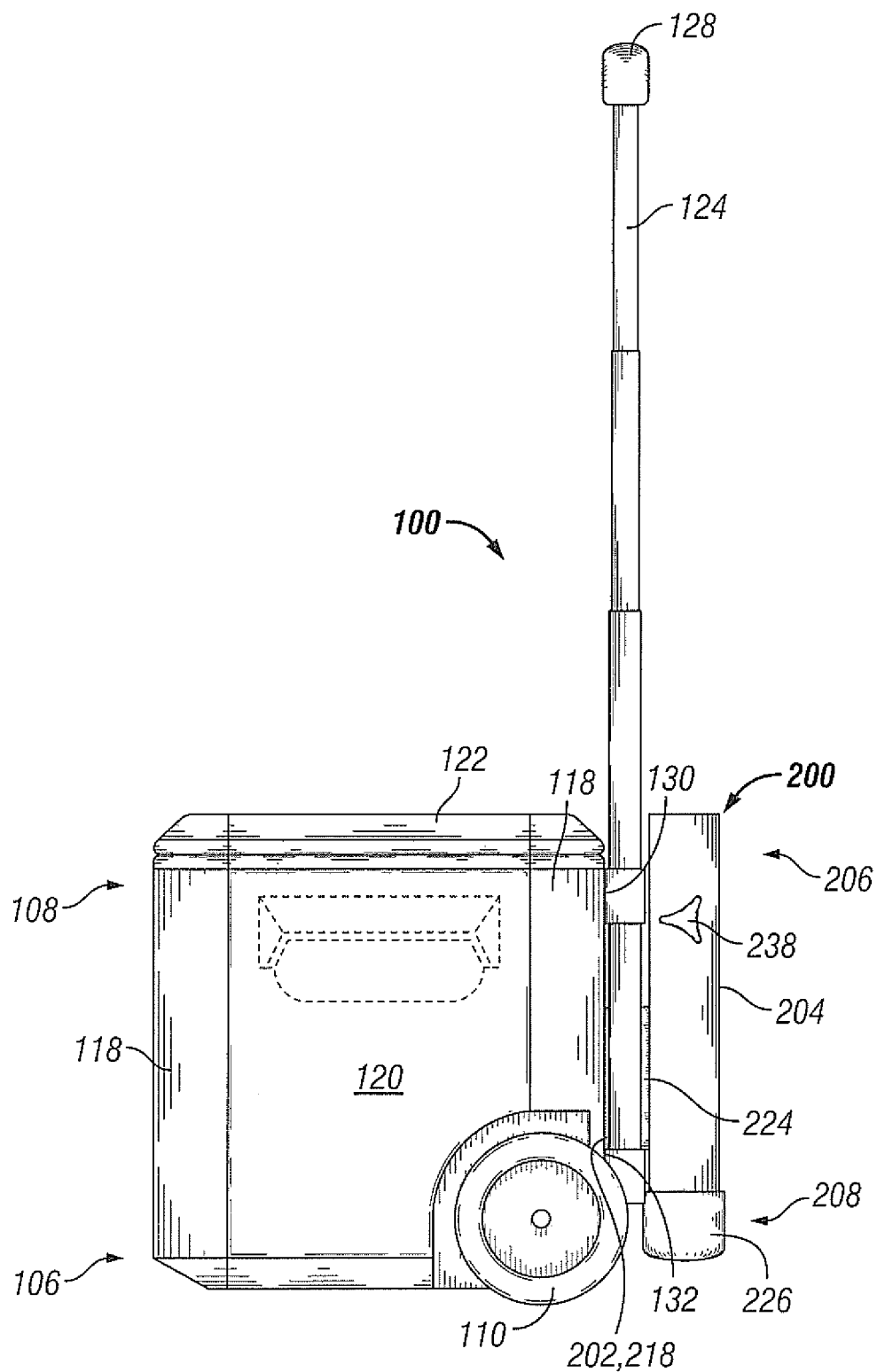
FIG. 9 is a side view of the detachable umbrella mount selectively mounted to the cooler shown in FIG. 8C.
Figure 10:
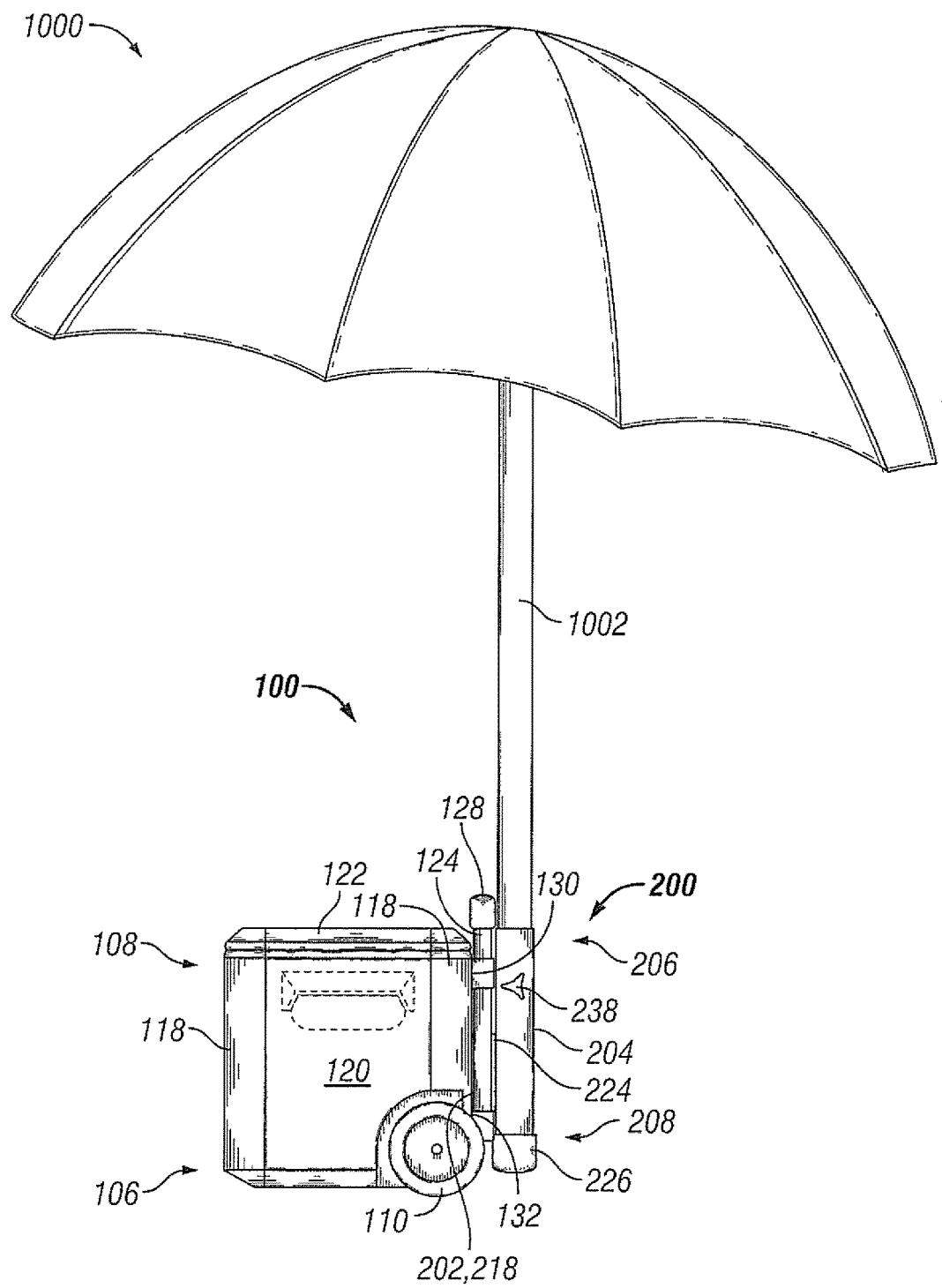
FIG. 10 is the detachable umbrella mount selectively mounted to the cooler shown in FIG. 9 with an umbrella disposed therein and the two handle bars in a collapsed position.

A method for selectively mounting a detachable umbrella mount of such embodiment illustrated in FIGS. 2-6 to a cooler of such embodiment illustrated in FIGS. 1A-1C may be better understood by reference to the schematic illustrations in FIGS. 8A-8C that depict the detachable umbrella mount 200 being mounted to the cooler 100. In FIG. 8A, the base 202 of the detachable umbrella mount 200 is placed between the two handle bars 124, 126 and against a side wall 104 of the container portion 102, in which the longitudinal axis ($L_B$) of the base 202 is substantially parallel to the longitudinal axis ($L_o$) of the container portion 102. As illustrated in FIG. 8B, the detachable umbrella mount 200 is then rotated about 90 degrees to position the base 202 between the side wall 104 of the container portion 102 and the two handle bars 124, 126 so as to bring the detachable umbrella mount 200 into a mounted configuration. Once the detachable umbrella mount 200 is in a mounted configuration, the two stabilizing elements 228, 230 are engaged with the base 202 as shown in FIG. 8C. Although the two stabilizing elements 228, 230 are not required for the detachable umbrella mount 200 to be in a mounted configuration, such elements beneficially prevent the base 202 from sliding between the two handle bars 124, 126 that can result in destabilizing the base 202. Referring now to FIG. 9, which is a side view of FIG. 8C, further illustrates the positioning of the detachable umbrella mount 200 to the cooler 100 when in the mounted configuration. FIG. 10 illustrates an exemplary use of the detachable umbrella mount shown in FIG. 9, in which the two handle bars 124,126 of the tow handle 112 are in a collapsed position and an umbrella 1000 is which the shaft 1002 is disposed within the detachable umbrella mount 200 that is selectively mounted to the cooler 100.

In some embodiments, the method further includes introducing the at least portion of a shaft of an umbrella into the top opening of the elongated tubular member.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

It will be appreciated that various above-disclosed and other features and functions, or alternatives thereof, may be desirably combined into many other different products or applications. Various presently unforeseen or unanticipated alternatives, modifications, variations, or improvements therein may be subsequently made by those skilled in the art which are also intended to be encompassed by the following claims.

We claim:

1. A detachable umbrella mount capable of attaching to a cooler, wherein the cooler includes a container portion that has at least one side wall extending from a container bottom to a container top and a longitudinal axis extending from the container bottom to the container top, wheels rotatably mounted to the container portion proximate the container bottom, and a tow handle mounted to the container portion and having two handle bars spaced from one another and extending along the at least one side wall in a direction at least generally parallel to the longitudinal axis to a handle bar connecting the two handle bars, said detachable umbrella mount comprising:

a base that is configured to be selectively engaged with the tow handle when the detachable umbrella mount is in a mounted configuration and, alternatively configured to be disengaged from the tow handle when the detachable umbrella mount is in an unmounted configuration, the base comprising two or more coupling elements; and an elongated tubular member attached to the base and extending from a base end to a top end having a top opening configured to receive at least a portion of a shaft of an umbrella, wherein the elongated tubular member is attached to the base such that, when the detachable umbrella mount is in the mounted configuration, the elongated tubular member is configured to extend in a direction at least generally parallel to the longitudinal axis of the container portion with the base end of the elongated tubular member closer to the container bottom than is the top end, and wherein the two or more coupling elements extend outwardly from a portion of the base that is attached to the elongated tubular member, in which one of the two or more coupling elements extends in a first direction and another of the two or more coupling elements extends in a second direction opposite the first direction such that, when the detachable umbrella mount is in the mounted configuration, the one of the two or more coupling elements is configured to be disposed in a first space between the at least one side wall and the one of the two handle bars and the another of the two or more coupling elements is configured to be disposed in a second space between the at least one side wall and the another of the two handle bars.

2. The detachable umbrella mount of claim 1, further comprising an offset member positioned between the base and the elongated tubular member, wherein the offset member is configured to space the elongated tubular member from the at least one side wall and the two handle bars when the detachable umbrella mount is in the mounted configuration.

3. The detachable umbrella mount of claim 2, further comprising two or more stabilizing elements that are configured to be engaged with the base when the detachable umbrella mount is in the mounted configuration to prevent the base from sliding between the two handle bars.

4. The detachable umbrella mount of claim 3, wherein the two or more stabilizing elements engage with the two or more coupling elements in a tongue and groove configuration.

5. The detachable umbrella mount of claim 3, wherein the two or more stabilizing elements adhesively engage with the two or more coupling elements.

6. The detachable umbrella mount of claim 3, wherein each of the two or more stabilizing elements comprise a stabilizing substrate and a connection element, wherein the connection element interconnects with or affixes to one of the two or more coupling elements.

7. The detachable umbrella mount of claim 1, wherein the elongated tubular member includes a base opening proximate the base end through which the umbrella shaft is extendable when the detachable umbrella mount is in the mounted configuration.

8. The detachable umbrella mount of claim 1, wherein the base end of the elongated tubular member is closed to prevent the umbrella shaft from extending out from the base opening of the elongated tubular member when the detachable umbrella mount is in the mounted configuration.

9. The detachable umbrella mount of claim 1, wherein the elongated tubular member includes a base opening proximate the base end and a closure for selectively closing the base opening to form a closed configuration for preventing the umbrella shaft from extending out from the base opening of the elongated tubular member when the detachable umbrella mount is in the mounted configuration and, alternatively, open the base opening to form an open configuration for allowing the umbrella shaft to be extendable through the base opening when the detachable umbrella mount is in the mounted configuration.

10. The detachable umbrella mount of claim 1, further comprising a securing element to lock the umbrella shaft in place within the elongated tubular member.

11. The detachable umbrella mount of claim 10, wherein the securing element comprises a retainer knob threadably engaged proximate to the top end of the elongated tubular member.

12. The detachable umbrella mount of claim 1, wherein the base has a longitudinal axis extending substantially parallel to the first and second directions such that, when the detachable umbrella mount is shifted from the unmounted configuration to the mounted configuration, the base is configured to be placed between the two handle bars and against the at least one side wall with the longitudinal axis of the base substantially parallel to the longitudinal axis of the container portion and then, the detachable umbrella mount is configured to be rotated about 90 degrees while maintaining the base against the at least one side wall.

13. The detachable umbrella mount of claim 1, wherein the base has a width that is greater than a distance between the two handle bars of the tow handle.

14. The detachable umbrella mount of claim 13, wherein the base has a length that is less than the distance between the two handle bars of the tow handle.

15. A cooler comprising:
a container portion, including at least one side wall extending from a container bottom to a container top, the container portion having a longitudinal axis extending from the container bottom to the container top;
wheels rotatably mounted to the container portion proximate the container bottom;
a tow handle mounted to the container portion, the tow handle having two handle bars spaced from one another and extending along the at least one side wall in a direction at least generally parallel to the longitudinal axis to a handle bar connecting the two handle bars; and
a detachable umbrella mount selectively affixed to the container portion, the detachable umbrella mount comprising,
a base that is configured to be selectively engaged with the tow handle when the detachable umbrella mount is in the mounted configuration and, alternatively disengaged from the tow handle when the detachable umbrella mount is in an unmounted configuration, the base comprising two or more coupling elements, and
an elongated tubular member attached to the base and extending from a base end to a top end having a top opening configured to receive at least a portion of a shaft of an umbrella, wherein the elongated tubular member is attached to the base such that, when the detachable umbrella mount is in the mounted configuration, the elongated tubular member extends in a direction at least generally parallel to the longitudinal axis of the container portion with the base end of the elongated tubular member closer to the container bottom than is the top end, and
wherein the two or more coupling elements extend outwardly from a portion of the base that is attached to the elongated tubular member, in which one of the two or more coupling elements extends in a first direction and another of the two or more coupling elements extends in a second direction opposite the first direction such that, when the detachable umbrella mount is in the mounted configuration, the one of the two or more coupling elements is disposed in a first space between the at least one side wall and the one of the two handle bars and the another of the two or more coupling elements is disposed in a second space between the at least one side wall and the another of the two handle bars.

16. The cooler of claim 15, wherein the detachable umbrella mount further comprises an offset member positioned between the base and the elongated tubular member for spacing the elongated tubular member from the at least one side wall and the two handle bars when the detachable umbrella mount is in the mounted configuration.

17. The cooler of claim 16, wherein the detachable umbrella mount further comprises two or more stabilizing elements engaged with the base when the detachable umbrella mount is in the mounted configuration to prevent the base from sliding between the two handle bars.

18. The cooler of claim 17, wherein the two or more stabilizing elements engage with the two or more coupling elements in a tongue and groove configuration.

19. The cooler of claim 17, wherein each of the two or more stabilizing elements comprise a stabilizing substrate and a connection element, wherein the connection element interconnects with or affixes to one of the two or more coupling elements.

20. The cooler of claim 15, wherein the elongated tubular member includes a base opening proximate the base end through which the umbrella shaft is extendable when the detachable umbrella mount is in the mounted configuration.

21. The cooler of claim 15, wherein the base end of the elongated tubular member is sealed closed to prevent the umbrella shaft from extending out from the base opening of the elongated tubular member when the detachable umbrella mount is in the mounted configuration.

22. The cooler of claim 15, wherein the elongated tubular member includes a base opening proximate the base end and a closure for selectively closing the base opening to form a closed configuration in which to prevent the umbrella shaft from extending out from the base opening of the elongated tubular member when the detachable umbrella mount is in the mounted configuration and, alternatively, open the base opening to form an open configuration to allow the umbrella shaft to be extendable through the base opening when the detachable umbrella mount is in the mounted configuration.

23. The cooler of claim 15, wherein the detachable umbrella mount further comprises a securing element to lock the umbrella shaft in place within the elongated tubular member.

24. A method for selectively mounting a detachable umbrella mount to a cooler, the method comprising,
engaging the base of the detachable umbrella mount of claim 1 with the tow handle of the cooler.

25. The method of claim 24, wherein the step of engaging comprises shifting the detachable umbrella mount from the unmounted configuration to the mounted configuration.

26. The method of claim 25, wherein the base has a longitudinal axis extending substantially parallel to the first and second directions, and wherein the step of shifting comprises,
- placing the base of the detachable umbrella mount between the two handle bars and against the at least one side wall with the longitudinal axis of the base substantially parallel to the longitudinal axis of the container portion, and
- rotating the detachable umbrella mount about 90 degrees while the base is maintained against the at least one side wall.

27. The method of claim 26, further comprising engaging two or more stabilizing elements with the base of the mounted detachable umbrella mount to prevent the base from sliding between the two handle bars.

28. The method of claim 27, wherein the step of engaging comprises connecting the two or more stabilizing elements with the two or more coupling elements in a tongue and groove configuration.

29. The method of claim 27, further comprising introducing the at least portion of the shaft of the umbrella into the top opening of the elongated tubular member.

30. The detachable umbrella mount of claim 1, further comprising the cooler.

31. The detachable umbrella mount of claim 1, wherein the one of the two or more coupling elements comprises a first engaging member and the another of the two or more coupling elements comprises a second engaging member.

32. The detachable umbrella mount of claim 31, wherein the base comprises a plate and a first portion of the plate comprises the first engaging member and a second portion of the plate comprises the second engaging member.

33. The cooler of claim 15, wherein the one of the two or more coupling elements comprises a first engaging member and the another of the two or more coupling elements comprises a second engaging member.

34. The cooler of claim 33, wherein the base comprises a plate and a first portion of the plate comprises the first engaging member and a second portion of the plate comprises the second engaging member.

* * * * *